Patented Sept. 7, 1954

2,688,550

UNITED STATES PATENT OFFICE 2,688,550

PROCESS FOR CLARIFYING AND STABILIZING VEGETABLE BEVERAGES

William D. McFarlane, Toronto, Ontario, Canada, assignor to Canadian Breweries Limited, Toronto, Ontario, Canada, a corporation of Ontario No Drawing. Application April 11, 1952, Serial No. 281,900

4 Claims. (Cl. 99—48)

This invention relates to a process for clarifying and stabilizing beverages derived from grains, fruits and vegetables, both fermented and unfermented, and more particularly relates to a method of processing tannin containing beverages.

Most beverages of the class contemplated are subject to the production of haze, particularly when chilled during storage. For example, a beer which may be perfectly clear at room temperature may become cloudy when cooled on ice. The cloudy effect is commonly known as "chill haze" and is due to the presence of protein tannin complex in the beer. In the case of wine and fruit juices, the presence of tannic acid may account for a chill haze characteristic.

Numerous preparations, mostly containing proteolytic enzymes as the active principle, are employed to-day for the purpose of solubilizing the chill haze protein occurring in a beer. When the beer is subjected to long storage, the components of the chill haze protein formed by enzymic digestion accomplished by the known use of proteolytic enzymes, may re-combine in the beer and consequently a haze reappears.

According to the present invention, I treat a vegetable beverage with polyvinyl pyrrolidone, which latter substance is well known and widely employed in medicine as a so-called blood plasma substitute and as a retardant vehicle for drugs. So far as I am aware, it has not heretofore been used in food and beverage processing. I have found that polyvinyl pyrrolidone has a special effect on tannic acid and protein tannin complex in that an action takes place of a physico-chemical nature which cannot be explained at the present time, but which results in the formation of a flocculent precipitate which settles rapidly. The resulting supernatant is relatively clear and free from colloidally dispersed particles which interfere with filtration; hence the liquid may be filtered rapidly, and the necessity for cleaning filters is greatly reduced.

According to the invention, polyvinyl pyrrolidone may be added to beer at the time of racking down from the fermenters or when the beer is being transferred from warm to cold cellar storage. The optimum amount of polyvinyl pyrrolidone varies with different beers but is within the range of one-half to two pounds per one hundred barrels (twenty-five thousand pounds) of beer, wherein the usual optimum will be found at the ratio of one part in 25,000 by weight. A precipitate forms in the beer within an hour or so after the addition of the polyvinyl pyrrolidone, which ultimately flocculates into large particles which settle to the bottom of the vessel containing the beer, thus effecting a material clarification in a relatively short time.

The present process of eliminating chill haze accomplishes the selective removal of offending tannin, that is, the protein tannin complex, from the beer and this may be carried out previous to pasteurizing. The present precipitating class of clarifying process effects a permanent clarification, since the precipitated protein tannin complex is readily removed by filtering. It is known that the protein tannin complex in beer contains traces of heavy metals such as copper and iron which catalyze undesirable oxidation changes affecting the flavour and other properties of stored beer and, accordingly, the removal of such metals by precipitation of the offending protein-tannin substance is desirable. Moreover, the protein tannin complex in the beer is especially rich in organic reduced sulphur generally believed to be responsible for the development of offending flavour and odours, especially if the beer is exposed to light. However, in the precipitation of the particular protein responsible for chill haze in beer by means of the present process, the organic reduced sulphur should be substantially eliminated and other proteins which play a desirable role in foam formation and stability and which impart palate fullness to the product, are retained. Enhanced foam formation and stability and improved flavour in the final product are indicated as a result of processing according to the present invention.

I have found that in the precipitating class of clarifying process according to the invention, the use of too little or too much polyvinyl pyrrolidone may not accomplish satisfactory clarification of the beverage being treated. In the case of wines, and other beverages containing tannic acid, the optimum amount of polyvinyl pyrrolidone is of the order of equal parts by weight of tannic acid in the beverage.

The substance polyvinyl pyrrolidone dissolves readily in water to give solutions of a high degree of clarity which are stable to boiling. In its capacity for binding water and absorbing physiological and non-physiological products, polyvinyl pyrrolidone shows a resemblance to proteins. The substance is non-toxic and its adaptability to beverages without contemplation of harm to the user is demonstrated by its wide use in medical therapy as a blood plasma substitute.

While it is preferred to add the polyvinyl pyrrolidone to the beer at the time of racking down from the fermenters, it should be realized that it can be added at an earlier stage in the brewing process, even at the mashing stage. However, larger amounts will be required to give the same results.

The method of removing tannins in a vegetable beverage according to the invention, brings about a desirable improvement in flavour, colour, clarity and physical stability in substantially all of the beverages.

What I claim as my invention is:

1. The process of clarifying and stabilizing a vegetable beverage comprising: adding polyvinyl pyrrolidone to the beverage in an amount sufficient only to materially precipitate therefrom a tannin of the group consisting of tannic acid and protein-tannin complex; and removing the precipitate from the beverage.

2. The process according to claim 1 and the step of pasteurizing the beverage after addition of polyvinyl pyrrolidone thereto.

3. The process of precipitating tannic acid from a vegetable beverage comprising: adding polyvinyl pyrrolidone to the beverage substantially in an amount corresponding to an equal part by weight of the tannic acid contained in the beverage; and separating the precipitate from the beverage 4. The process of clarifying and stabilizing beer, comprising: adding polyvinyl pyrrolidone to the beer to precipitate protein-tannin complex therefrom, the amount of polyvinyl pyrrolidone added being in the proportion of between one-half and two pounds per twenty-five thousand pounds of beer.

No references cited.